United States Patent
Gretz

(10) Patent No.: US 7,005,578 B2
(45) Date of Patent: Feb. 28, 2006

(54) RAINPROOF RECESSED OUTLET BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 59 days.

(21) Appl. No.: 11/009,116

(22) Filed: Dec. 10, 2004

(65) Prior Publication Data

US 2005/0274538 A1    Dec. 15, 2005

Related U.S. Application Data

(63) Continuation-in-part of application No. 10/863,942, filed on Jun. 9, 2004.

(51) Int. Cl.
*H01H 9/02* (2006.01)

(52) U.S. Cl. .............. 174/58; 174/57; 174/63; 174/50; 248/906; 439/535

(58) Field of Classification Search .......... 174/57, 174/58, 50, 63; 220/3.5, 3.7, 4.02, 3.3, 3.9; 439/535; 248/906
See application file for complete search history.

(56) References Cited

U.S. PATENT DOCUMENTS

| | | | |
|---|---|---|---|
| 4,265,365 A | * | 5/1981 | Boteler .................. 220/3.3 |
| 4,634,015 A | | 1/1987 | Taylor |
| 4,988,832 A | | 1/1991 | Shotey |
| 5,280,135 A | | 1/1994 | Berlin et al. |
| 5,389,740 A | * | 2/1995 | Austin .................. 174/67 |
| 6,437,242 B1 | | 8/2002 | Radosavljevic et al. |
| 6,563,051 B1 | | 5/2003 | Shotey et al. |
| 6,737,576 B1 | | 5/2004 | Dinh |
| 6,753,471 B1 | | 6/2004 | Johnson et al. |
| 6,808,079 B1 | | 10/2004 | Lalancette et al. |

OTHER PUBLICATIONS

CA 644,330 Issued Jul. 10, 1962.

* cited by examiner

*Primary Examiner*—Dhiru R. Patel
(74) *Attorney, Agent, or Firm*—Auzville Jackson, Jr.

(57) ABSTRACT

A recessed electrical box with a closeable cover member and at least one outward extending flange. The flange serves as a positioning arrangement to recess the electrical box at the correct depth with respect to the surface in which it will be mounted. The recessed electrical box is includes of two pieces, including a one-piece electrical box and a one-piece cover member. The cover member is of minimal size with respect to the electrical box to minimize the cost of construction. The electrical box can be installed on an exterior wall, including either a finished or an unfinished wall. The outward extending flange may include an inner flange for positioning the recessed electrical box with respect to the outer surface of the substrate on an unfinished building. The inner flange is removable to facilitate installation on a finished building, in which the finish layer such as siding or stucco is installed. The recessed electrical box may include a second, outer flange, for recessing the box at the correct depth with respect to a finished surface and to occlude from view the sidewalls of the box at their juncture with the finished surface.

18 Claims, 17 Drawing Sheets

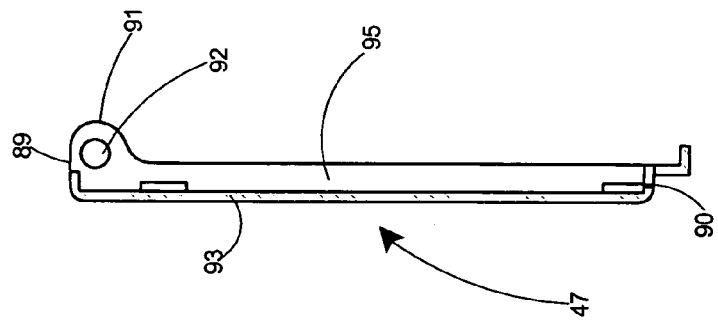
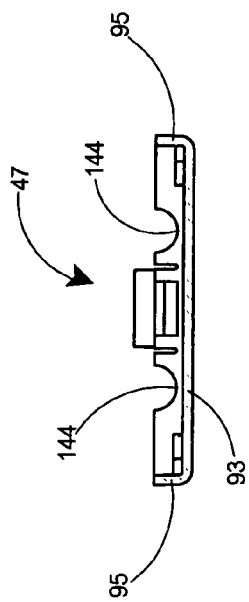
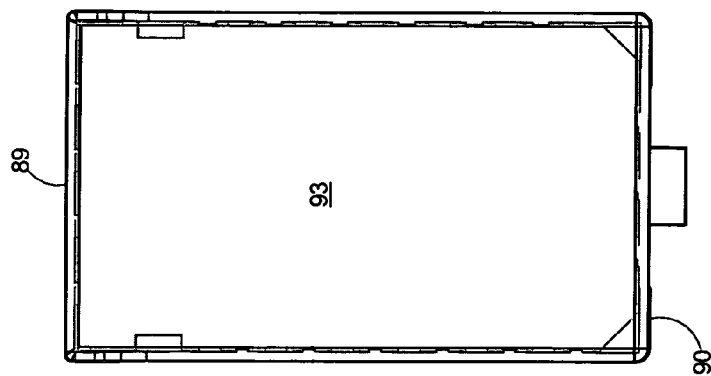
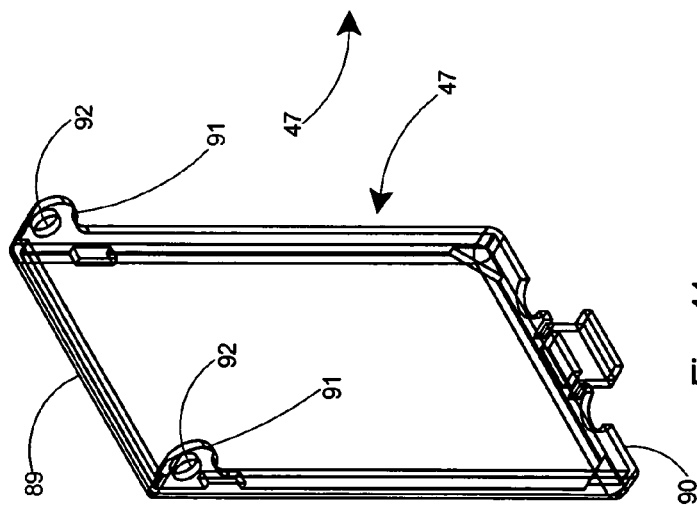

RAINPROOF RECESSED OUTLET BOX

This application is a Continuation-In-Part of U.S. patent application Ser. No. 10/863,942 filed Jun. 9, 2004 and still pending.

FIELD OF THE INVENTION

This invention relates to electrical junction boxes and specifically to a recessed outlet box that secures an electrical device substantially behind the exterior of a building for accommodating and protecting a duplex outlet or other electrical device therein.

BACKGROUND OF THE INVENTION

In the mounting of outlets to the exterior of a building, covered electrical boxes are commonly used for providing a rainproof electrical enclosure. These outdoor electrical enclosures are typically multi-piece structures, typically comprising three or more separate pieces to provide a weatherproof enclosure.

U.S. Pat. No. 5,280,135 (hereinafter the '135 patent), for example, discloses an outdoor weatherproof electrical outlet cover adapted to be attached in weatherproof connection to an electrical outlet. The outlet cover includes a base plate, insert, gasket, and protective housing that are used in conjunction with an electrical box to provides a weatherproof enclosure for an electrical outlet. Although the outlet cover disclosed in this patent provides adequate protection for the outlet against the weather, it is inordinately complex, requiring a four-piece assembly, in addition to the electrical box. The protective housing itself is quite large, in fact the largest piece in the assembly, as it must project beyond the front of the base plate to allow space for accommodating a couple of three-prong plugs therein. As protective housings or covers for electrical outlets must pass a cold impact test to meet established electrical codes, they are typically constructed of high impact resistant plastics. Therefore the protective housing of the '135 patent, which is a relatively large piece in the assembly described therein, must be constructed of impact resistant plastic, which is significantly more expensive than non-impact resistant plastics. Additionally, the outlet cover of the '135 patent provides for coverage of a standard electrical box in which the outlet is mounted even with the wall surface. In case of a hard impact that breaks the protective housing, there is no additional protection to the outlet, which being mounted at the surface, is subject to impact once the protective housing is broken.

Accordingly, what is needed is an outlet box that is recessed to place the outlet substantially behind the wall surface, thereby providing additional protection to the outlet from hard impacts capable of breaking the protective cover. Additionally the outlet box should be of simple construction and assembled from a minimum number of separate parts. Furthermore, the construction should be such that the size of the cover is minimized, to limit the cost of producing the outlet box.

SUMMARY OF THE INVENTION

The invention is a recessed electrical box with a closeable cover member. The box may include a flange that serves as a positioning arrangement to recess the electrical box at the correct depth with respect to the surface in which it will be mounted. The recessed electrical box is comprised of two pieces, including a one-piece electrical box and a one-piece cover member. The cover member is of minimal size with respect to the electrical box to minimize the cost of construction. The electrical box can be installed on an exterior wall, including either as a retrofit on a finished building or as an installation on the wall of a building under construction. The outward extending flange may include an inner flange for positioning the recessed electrical box with respect to the outer surface of the substrate on a building under construction. The inner flange is removable to facilitate installation in a retrofit situation, in which the finish layer such as siding, stucco, or masonry is installed. The recessed electrical box may include a second, outer flange, for recessing the box at the correct depth with respect to a finished surface and to occlude from view the sidewalls of the box at their juncture with the finished surface.

OBJECTS AND ADVANTAGES

A first advantage of the recessed electrical box is that it properly recesses or positions the box at the proper depth with respect to the outer surface of the building. The electrical box may include one or more outward extending flanges that provide a positioning mechanism to recess the electrical box at the correct depth within the building's surface. The positioning mechanism is functional for both a retrofit situation, in which the finished layer such as siding or stucco is installed, or in a building under construction in which the finished layer has not been installed.

A second advantage is that a while-in-use cover member, which renders the recessed electrical box rainproof, is minimal in size with respect to the box. Cover members are typically molded of expensive impact resistant plastic to meet electrical code. Keeping the cover minimal in size with respect to the box lowers the cost of production of the outlet box.

A further advantage is that the recessed electrical box positions an enclosed electrical device substantially behind the outer surface of the building. This provides added protection to the electrical device and insures that any hard impacts that destroy the cover member do not also damage the electrical device.

The recessed electrical box furthermore provides the advantage of being constructed of a minimal number of parts. It includes only two separately molded pieces, including the electrical box and the cover member. Construction of the box is therefore simplified and production costs are minimized as compared to similar prior art electrical boxes.

A further advantage of the recessed electrical box is that the cover member is a while-in-use cover, allowing electrical cords to remain connected to the electrical outlet within the box with the cover member closed thereon. Therefore the recessed electrical box provides rainproof protection to the outlets even while electrical cords are connected to the electrical outlets therein.

The electrical box furthermore includes integral bosses with bores therein, which may be smooth or threaded bores, for accepting fasteners from standard wall-mounted electrical devices, such as outlets or switches.

These and other objects and advantages of the present invention will be better understood by reading the following description along with reference to the drawings.

DESCRIPTION OF THE DRAWINGS

FIG. 11 is a perspective view of a cover member used with the electrical box of the present invention.

FIG. 12 is a front view of the cover member of FIG. 11.

FIG. 13 is a side view of the cover member of FIG. 11.

FIG. 14 is a bottom view of the cover member of FIG. 11.

TABLE OF NOMENCLATURE

Figure 1:
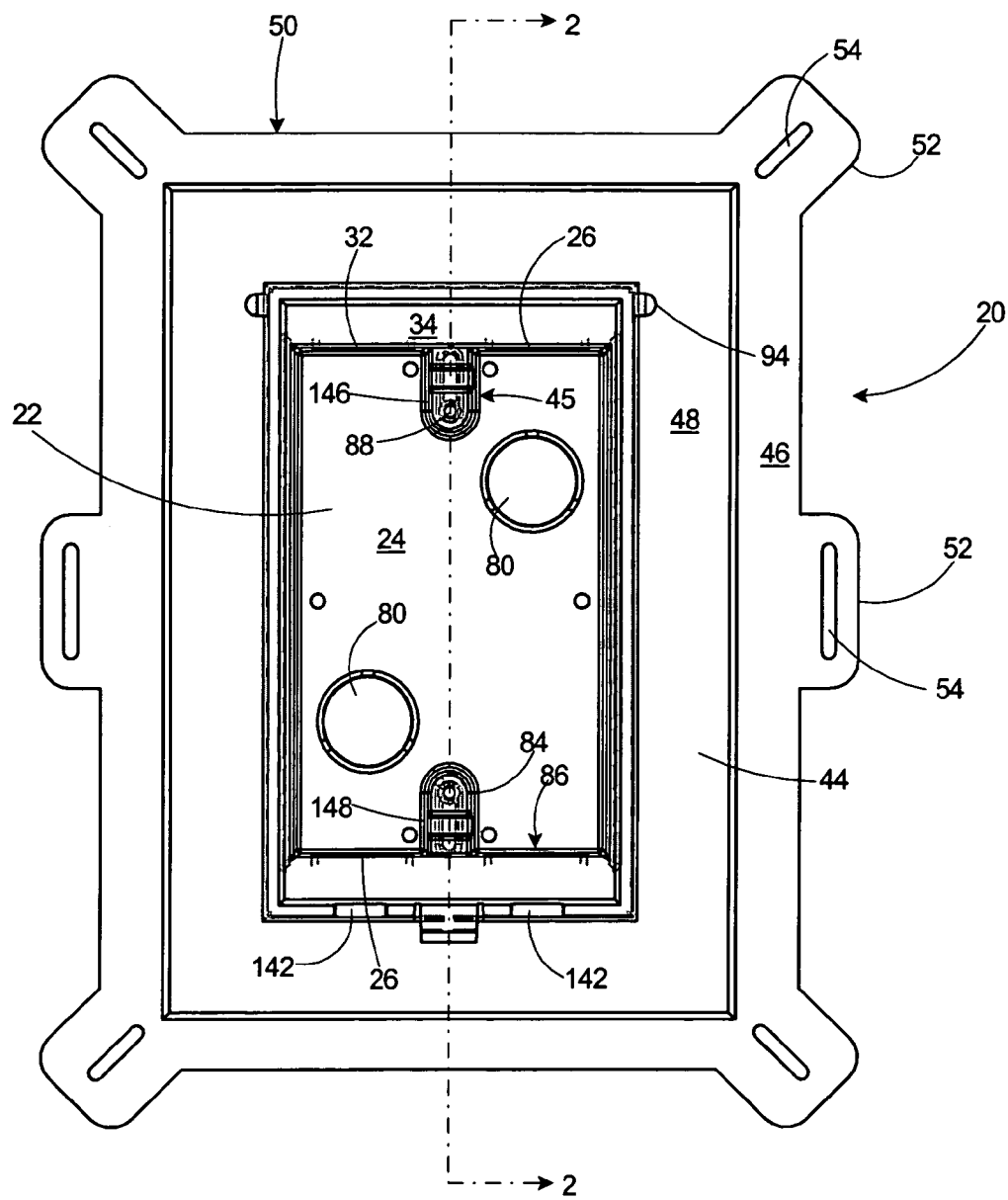
FIG. 1 is a front view of a first and preferred embodiment of a recessed electrical box according to the present invention.

The following is a listing of part numbers used in the drawings along with a brief description:

| Part Number | Description |
| --- | --- |
| 20 | recessed electrical box, preferred embodiment |
| 22 | first box |
| 24 | back wall of first box |
| 26 | peripheral sidewalls of first box |
| 28 | front opening of first box |
| 30 | cavity or first enclosure |
| 32 | front edge of first box |
| 34 | transverse wall portion |
| 36 | second peripheral sidewalls |
| 38 | second box |
| 40 | second enclosure |
| 41 | box member |
| 42 | planar front edge of second box |
| 44 | front opening of second box |
| 45 | securement arrangement |
| 46 | inner flange |
| 47 | cover member |
| 48 | outer flange |
| 50 | outer edge of inner flange |
| 52 | ear on inner flange |
| 54 | slot |
| 56 | back surface of inner flange |
| 58 | groove |
| 60 | first side of inner flange |
| 62 | second side of inner flange |
| 64 | third side of inner flange |
| 66 | fourth side of inner flange |
| 68 | outer periphery of second box |
| 70 | outer periphery of first box |
| 72 | plane of inner flange |
| 74 | plane of outer flange |
| 76 | apertures in outer flange |
| 80 | removable wall portion |
| 81 | circular cord opening |
| 84 | integral projections |
| 86 | inner surface of peripheral sidewalls |
| 88 | threaded bore |
| 89 | top end of cover member |
| 90 | bottom end of cover member |
| 91 | ear of cover member |
| 92 | aperture |
| 93 | front wall of cover member |
| 94 | post |
| 95 | stiffening side wall |
| 96 | cover arrangement |
| 97 | gap |
| 100 | recessed electrical box, second embodiment |
| 102 | hole in substrate, siding, or both |
| 104 | siding |
| 106 | substrate |
| 107 | caulking |
| 110 | recessed electrical box, third embodiment |
| 112 | stucco finish layer |
| 114 | holes in inner flange |
| 118 | fastener |
| 120 | hole in outer flange |
| 122 | back surface of outer flange |
| 124 | hole in outer flange |
| 126 | duplex outlet |
| 128 | device fasteners |
| 130 | face plate |
| 132 | terminal of duplex outlet |
| 134 | plug end |
| 136 | electrical cord |
| 138 | outside surface of building |
| 139 | positioning arrangement |
| 140 | outer surface of substrate |
| 142 | U-shaped slots in box member |
| 144 | U-shaped slots in cover member |
| 146 | top boss |
| 148 | bottom boss |
| 150 | aperture in sidewalls of second box |
| 152 | inward-extending post on cover member |
| 154 | aperture in cover member |
| 156 | bolt |
| 158 | nut |

DETAILED DESCRIPTION OF THE INVENTION

The present invention comprises a recessed electrical box for securing an electrical device on the exterior wall of a building. The recessed electrical box has features that allow it to be easily recessed to the correct depth on either a new building or on an existing building. It can be installed on a new building having unfinished walls, in which the finishing surface, such as siding or stucco, will be installed later, or as a retrofit on an existing building.

With reference to FIGS. 1–4, a first and preferred embodiment of a recessed electrical box 20 according to the present invention is shown. The recessed electrical box includes a first box 22 having a back wall 24, peripheral sidewalls 26 extending orthogonally to the back wall 24, and a front opening 28 defining a cavity or first enclosure 30 therein. The peripheral sidewalls 26 of the first box 22 include a front edge 32 at the front opening 28. A transverse wall portion 34 extends outwardly and orthogonally from the peripheral sidewalls 26 at the front edge 32. Second peripheral sidewalls 36 extend orthogonally from the transverse wall portion 34 and form a second box 38 and a second enclosure 40 therein. The first box 22 and second box 38 may be molded in one piece from plastic and form a one-piece box member 41. Alternatively, the first box 22 and second box 38 may be formed of metal in one piece, or each box 22, 38 formed of metal and then secured together by conventional means. The second peripheral sidewalls 36 terminate in a planar front edge 42. The planar front edge 42 includes a front opening 44 therein leading into the second enclosure 40. A securement arrangement 45 at the front opening 28 of the first enclosure 30 is capable of accepting an electrical device (not shown) therein. A cover member 47 is pivotally attached to the box member 41 to form a recessed electrical box 20 according to the present invention.

Figure 2A:
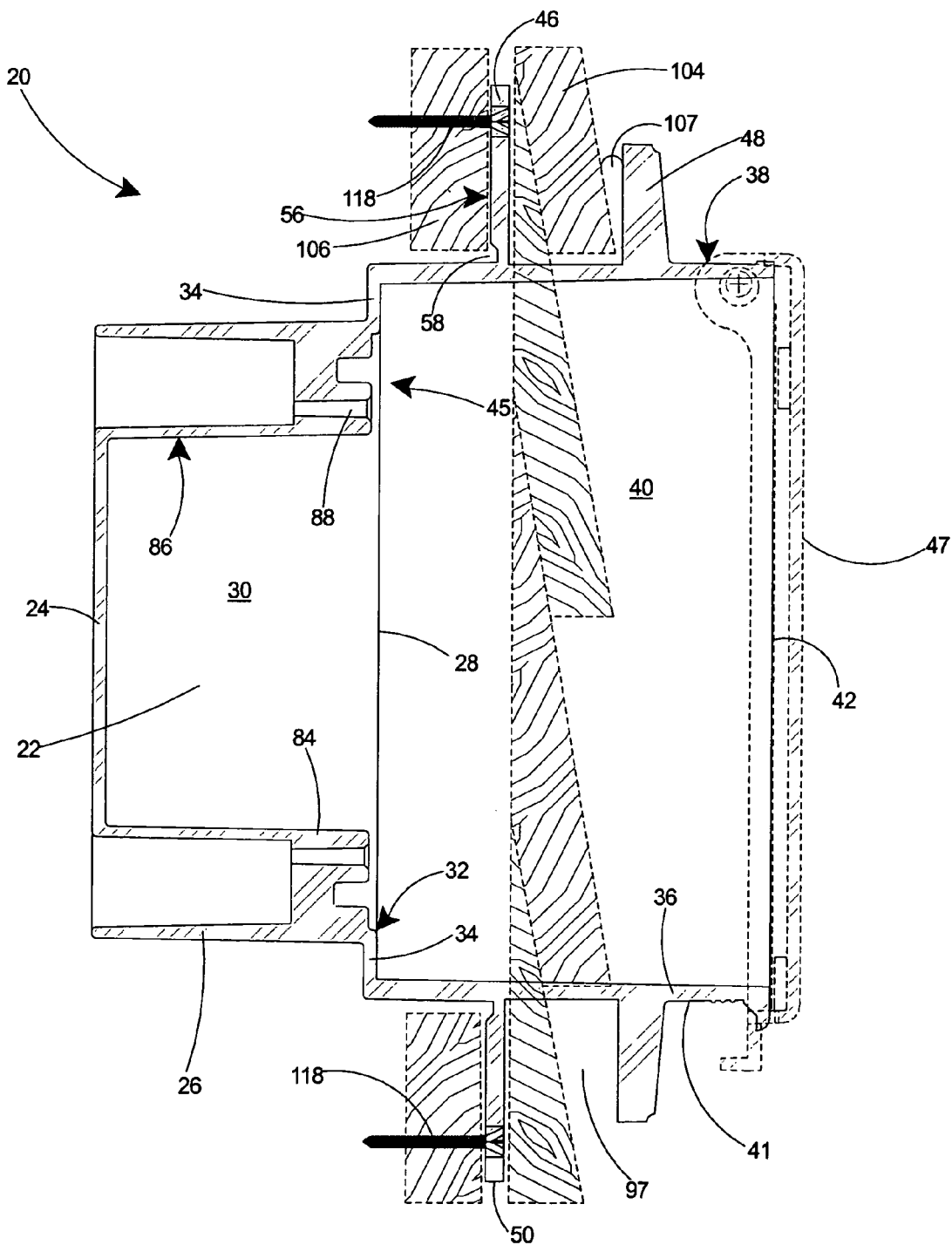
FIG. 2A is a sectional view of the recessed electrical box taken along line 2—2 of FIG. 1 and shown mounted to the substrate of a newly constructed building.
Figure 4:
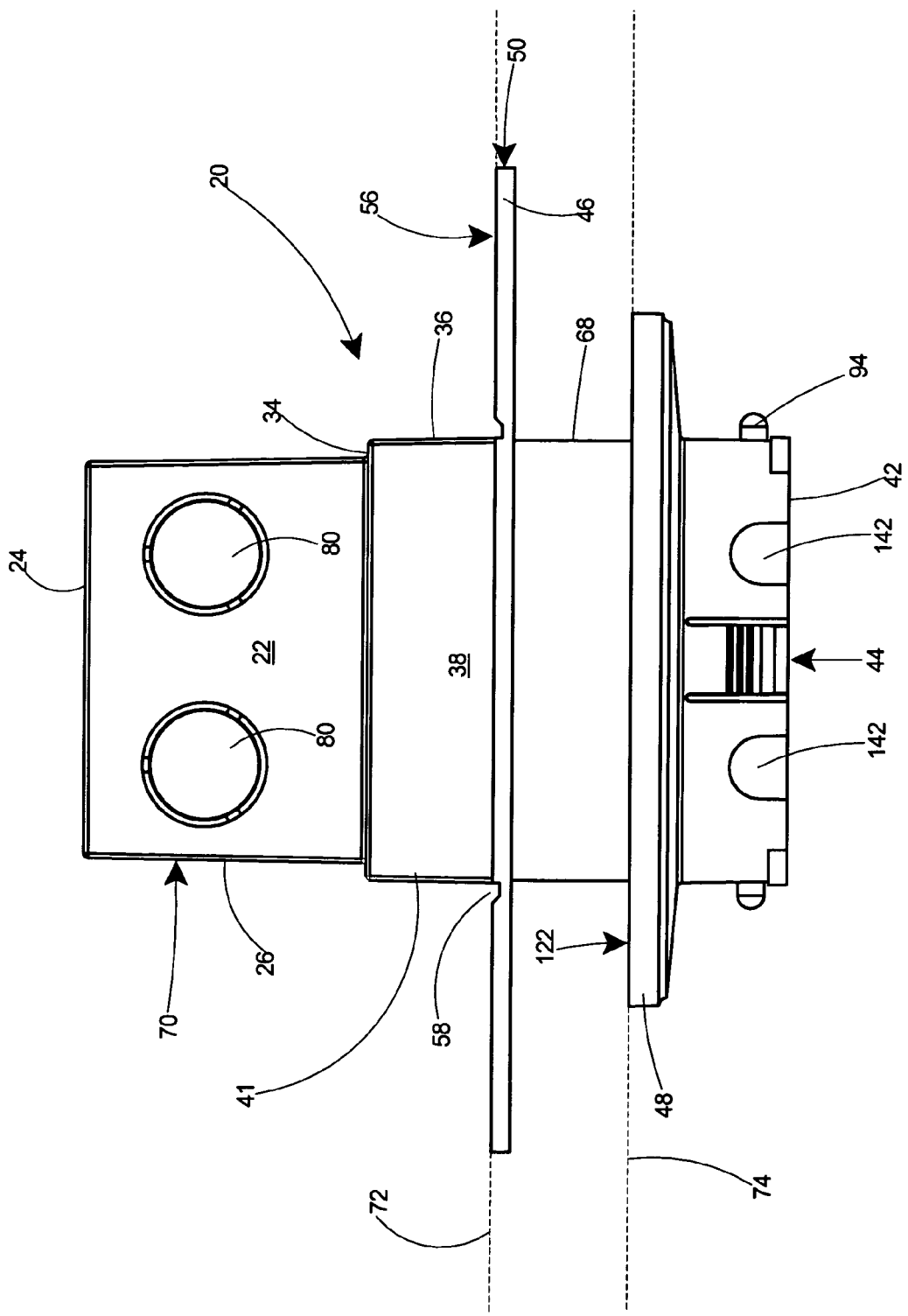
FIG. 4 is a bottom view of the electrical box of FIG. 1.
Figure 5:
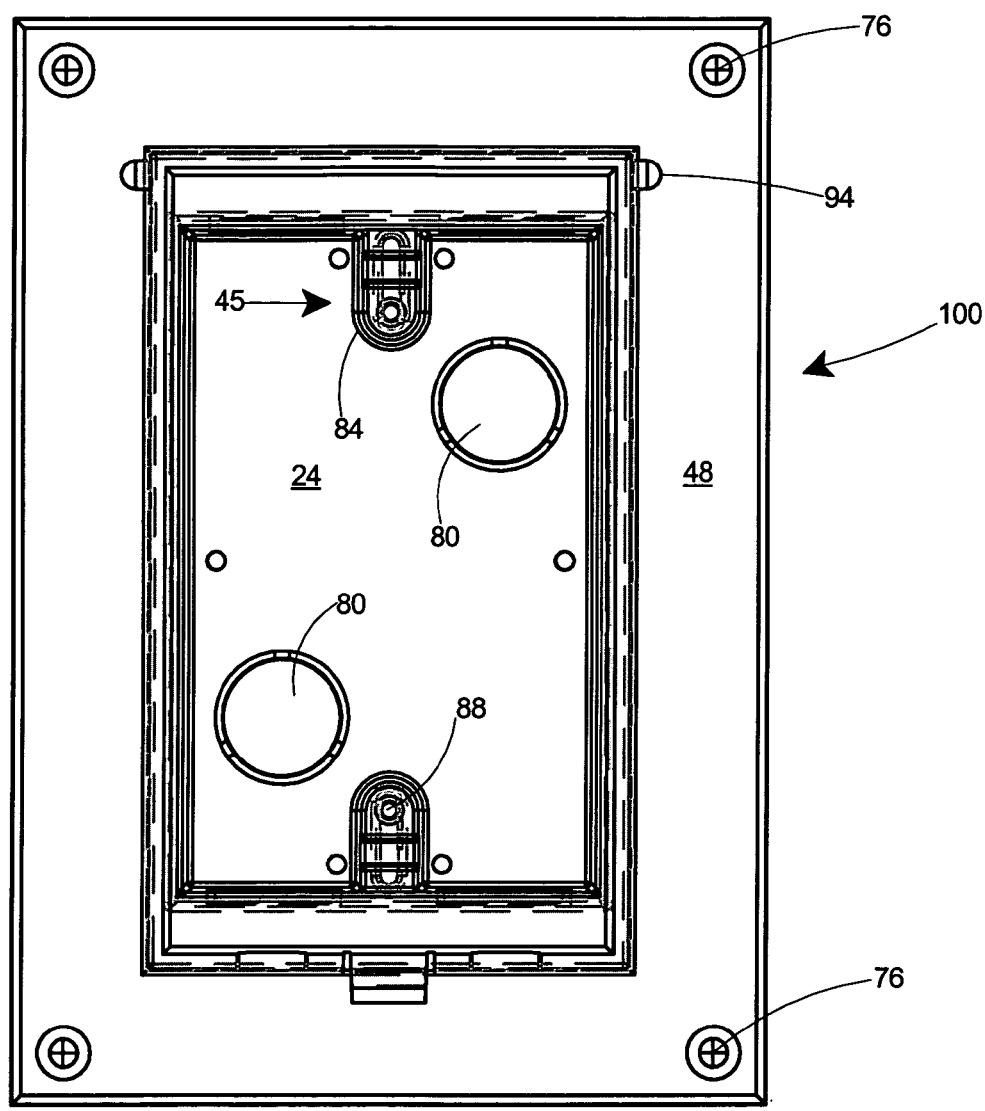
FIG. 5 is a front view of a second embodiment of a recessed electrical box according to the present invention.

The recessed electrical box of the present invention may include at least one flange integral with and extending outwardly and orthogonally from the second peripheral sidewalls. For the preferred embodiment, as shown in FIGS. 2A and 4, the recessed electrical box 20 includes an inner flange 46 and an outer flange 48. As shown in FIGS. 1 and 4, the inner flange 46 extends transversely substantially beyond the outer flange 48. The outer flange 48 extends transversely substantially beyond the second peripheral sidewalls 36. The inner flange 46 includes an outer edge 50 and a plurality of ears 52 extending beyond the outer edge 50. A slot 54 is included in each of the ears 52 of the inner flange 46.

Figure 3:
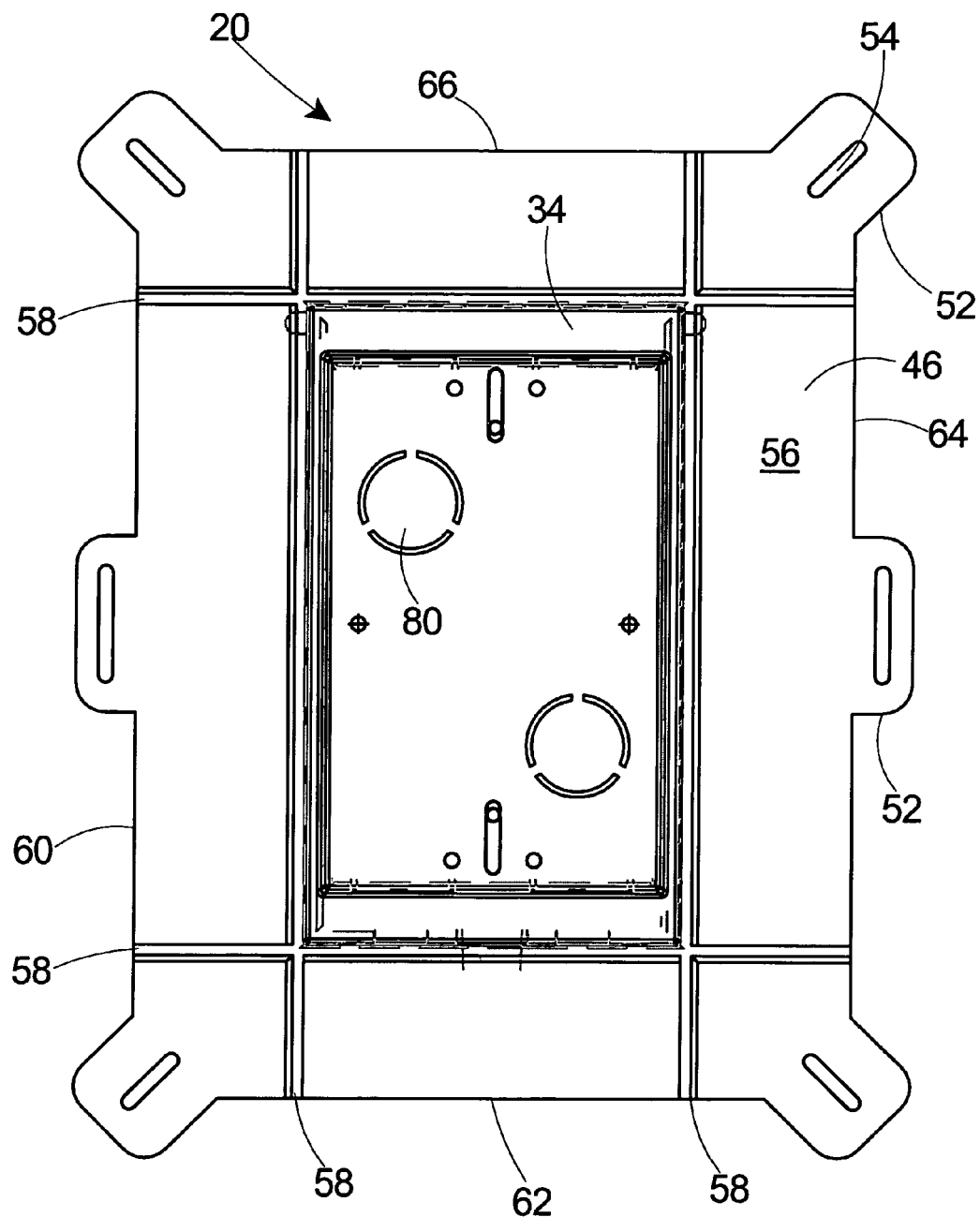
FIG. 3 is back view of the electrical box of FIG. 1.

Referring to FIGS. 2A and 3, the back surface 56 of the inner flange 46 includes grooves 58 adjacent each of the second peripheral sidewalls 36. The grooves 58 extend from one side 60, 62 of the outer edge 50 to the corresponding opposing side 64, 66 of the outer edge 50. The grooves 58 form reduced thickness flange portions to allow scoring therein to remove the inner flange 46 adjacent the second peripheral sidewalls 36.

With reference to FIG. 4, the second box 38 has an outer periphery 68 that, as a result of the outwardly extending transverse wall portion 34, is larger than the outer periphery 70 of the first box 22. The inner 46 and outer 48 flanges are in parallel planes 72, 74. Removal of the inner flange 46 creates an outer surface substantially equal to the outer periphery 68 of the second box 38 or, in other words, scoring along the grooves 58 adjacent the outer periphery 68 and subsequently breaking off the inner flange 46 creates a smooth outer periphery with the inner flange 46 completely removed therefrom. The outer flange 48, as shown in FIG. 4, extends substantially beyond the second peripheral sidewalls 36.

Referring to FIGS. 1 and 4, the back wall 24 and the peripheral sidewalls 26 of the first box 22 include one or more removable wall portions 80 or knockouts, which may be removed to provide a passage for wiring into the first box 22. The second peripheral sidewalls 36 of the second box 38 also include one or more U-shaped slots 142 extending therein from the front edge 42 at the front opening 44.

With reference to FIGS. 1 and 2A, the recessed electrical box further includes a securement arrangement 45. The securement arrangement 45 includes integral projections 84 from the inner surface 86 of the peripheral sidewalls 26 that extend transversely into the first enclosure 30. The integral projections 84 include bores 88 therein, which may be smooth bores or threaded.

The recessed electrical box can further include a cover member 47 having a top end 89, bottom end 90, ears 91 extending from the top end 89, and apertures 92 within the ears 91 as shown in FIGS. 11–14. The cover member 47 includes a front wall 93 and a stiffening side wall 95 that rigidifies and provides structural support to the front wall portion 93. The cover member 47, which much pass an impact test according to the electrical code, is typically constructed of high impact resistant plastic. The high impact resistant plastic is more expensive than typical non-impact resistant plastics that are used to construct the electrical box. The cover member 47 of the present invention is therefore made as small in size as possible to lower production costs. To lower the weight of high impact resistant plastic used, the stiffening side wall 95 extends no more than 0.30 inch from the front wall 93 and the front wall 93 is no greater than 3.5 inches width by 6.0 inches length. Therefore the largest volume component of the present invention consists of the box member 41, which is constructed of cheaper non-impact resistant plastics. The box member 41 is typically molded of non-impact resistant plastic in one piece. The cover member 47 is typically molded of high impact resistant plastic in one piece. The recessed electrical box of the present invention is therefore of two-piece construction, which is much simpler construction than the three or more piece prior art boxes.

Figure 18:
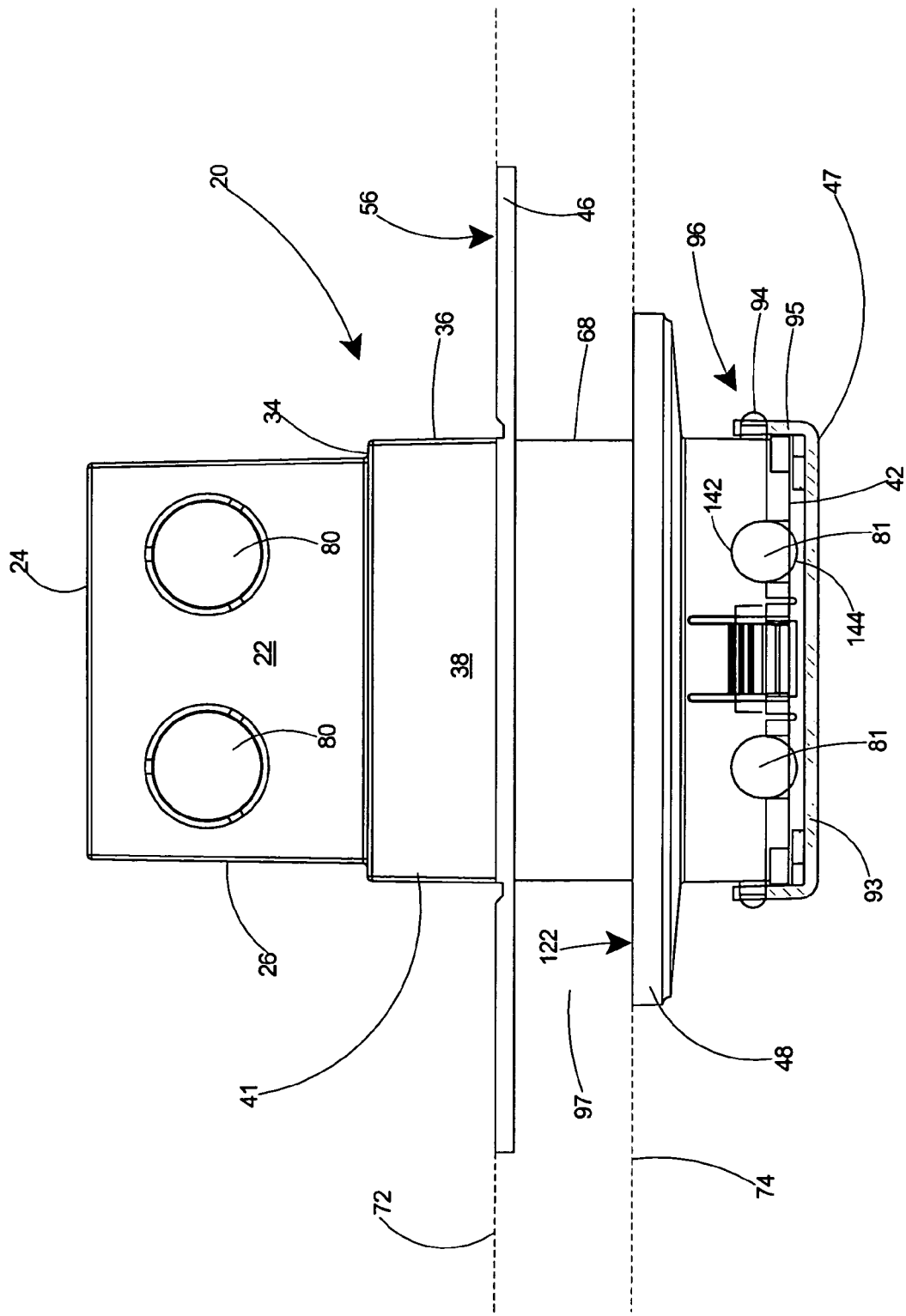
FIG. 18 is a bottom view of the recessed electrical box of FIG. 4 with the cover member attached thereto.

With reference to FIG. 18, the recessed electrical box 20 is provided with posts 94 near the planar front edge 42 of the second box 38 upon which the ears 91 of the cover member 47 are snapped thereover, with the posts 94 protruding through the apertures 92 in the ears 91, to cover the outer front opening 44 of the recessed electrical box 20. The cover member 47 is then pivotable on the posts 94. The posts 94 and cover member 47 comprise a cover arrangement 96 for closing the front opening 44 of the second box 38 in a rainproof closure. The inner 46 and outer 48 flanges of the recessed electrical box 20 reside in parallel planes 72, 74 and form a gap 97 therebetween around all four sides of the electrical box 20. The size of the gap 97 is between 0.7 to 0.9 inch to allow it to accept siding of most standard thicknesses.

Figure 8:
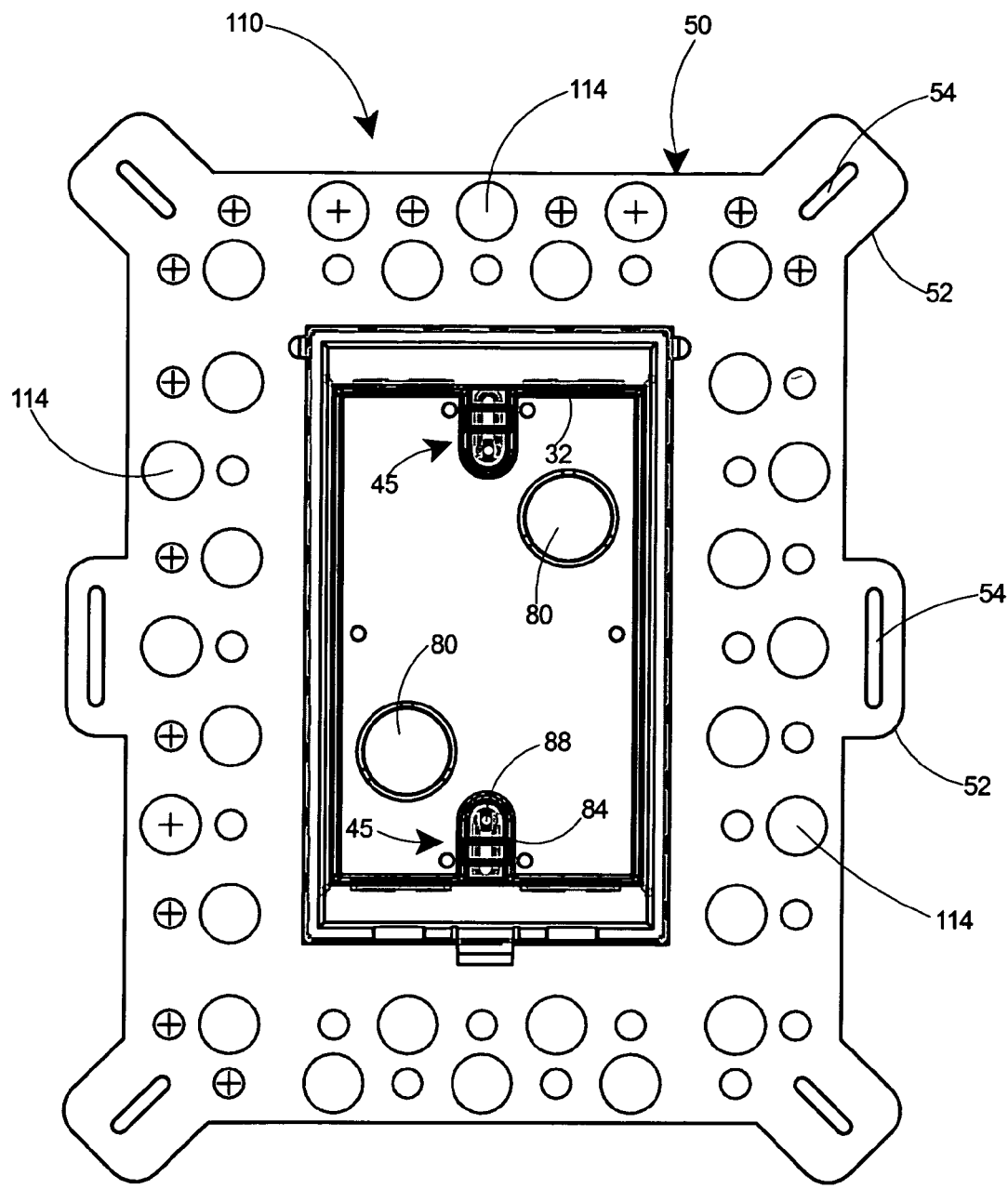
FIG. 8 is a front view of a third embodiment of a recessed electrical box according to the present invention.
Figure 9:
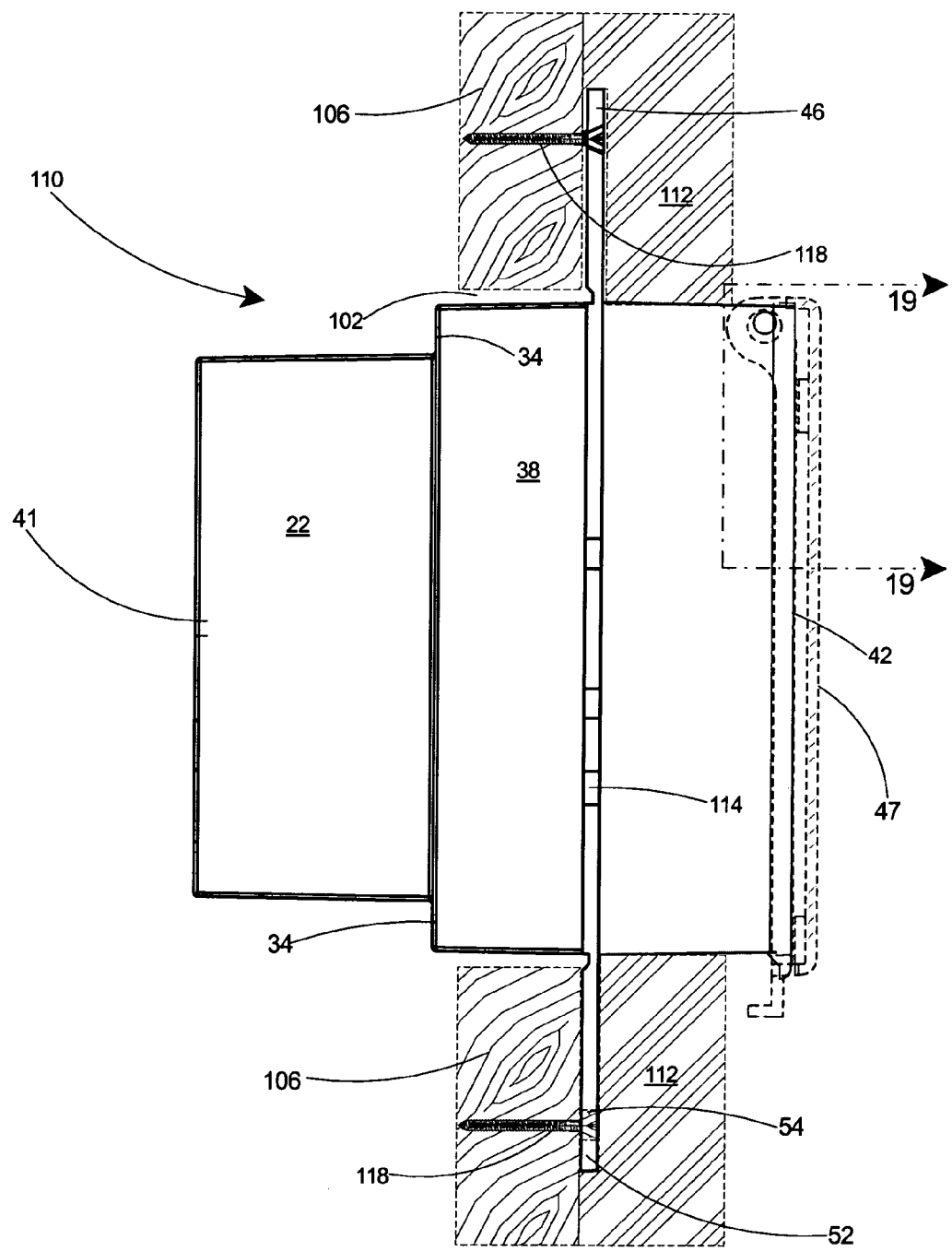
FIG. 9 is a side view of the recessed electrical box taken along line 9—9 of FIG. 8.
Figure 10:
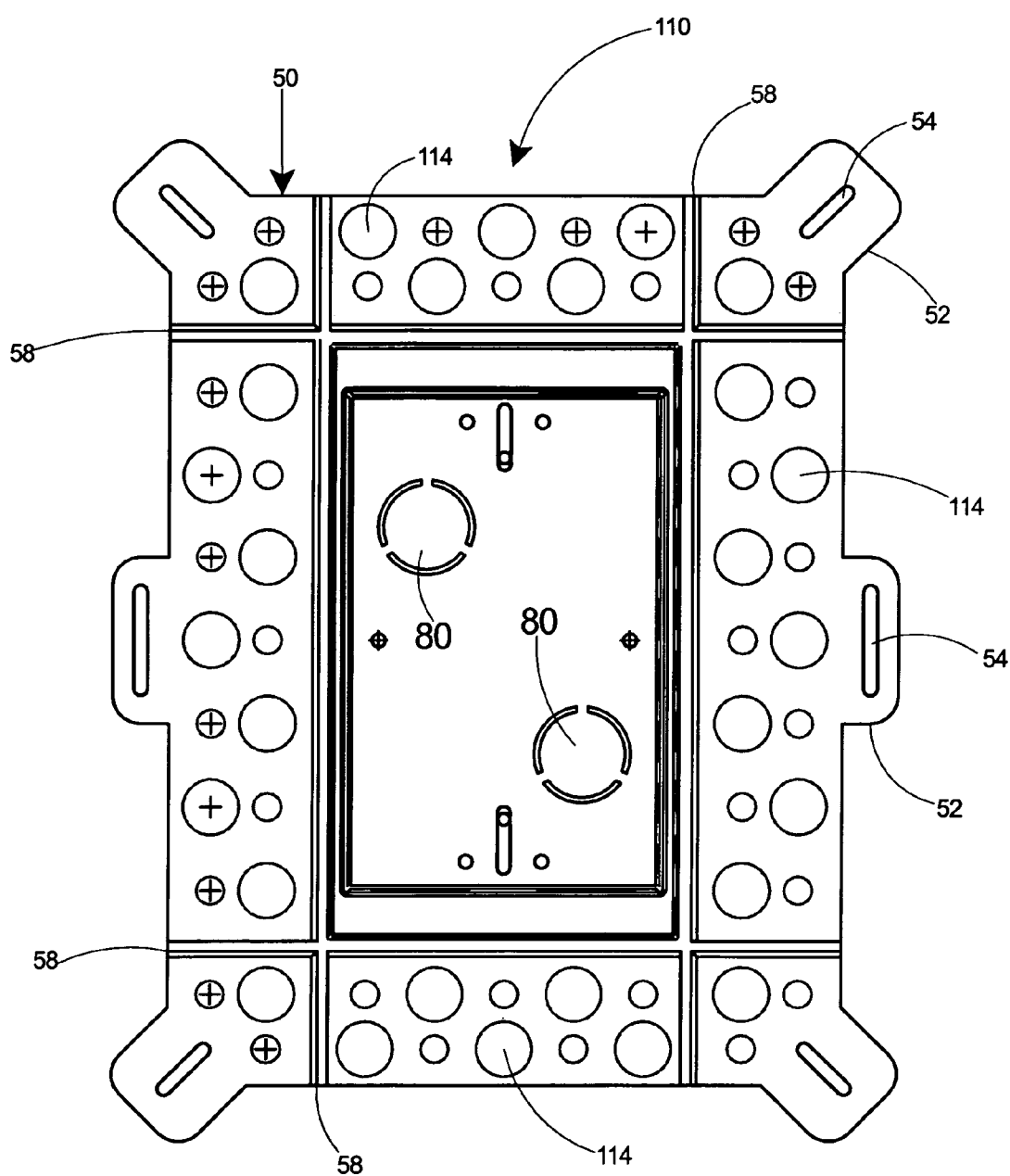
FIG. 10 is a back view of the electrical box of FIG. 8.

Referring to FIGS. 8–10, there is shown a third embodiment 110 of a recessed electrical box according to the present invention. The third embodiment of the recessed electrical box 110 is for use on a new building that is to be finished with a stucco layer 112. Electrical box 110 includes a removable inner flange 46 but no outer flange. As shown in FIG. 9, on an unfinished building, the box 110 is simply pushed into an appropriately sized hole 102 that has been cut in the substrate 106. There is no need for an outer flange, as a stucco layer will later be applied over the inner flange 46.

All of the embodiments of the recessed electrical box as presented herein are preferably integrally formed in one piece. Therefore the first box 22, the second box 38, and the flange or flanges, including the inner flange 46 and the outer flange 48, are integrally molded in one piece. The recessed electrical box is preferably formed by injection molding of plastic. The plastic used to form the recessed electrical box is preferably polyvinyl chloride, polyethylene, or polypropylene. Alternatively, the electrical box may be formed of metal. The first box 22 and second box 38 may be formed of metal in one piece or the boxes 22, 38 formed separately of metal and secured together by conventional means such as screws and nuts to form the electrical box of the present invention.

The recessed electrical box of the present invention simplifies the installation of electrical devices on all types of finished exteriors, including siding or stucco. It is adaptable to being installed on an unfinished wall or as a retrofit on an existing finished wall. Operation of the recessed electrical box is accomplished by first determining whether it will be used in new construction, in which the building substrate is installed but not the siding or other finish layer, or it will be used on an existing building.

Figure 2B:
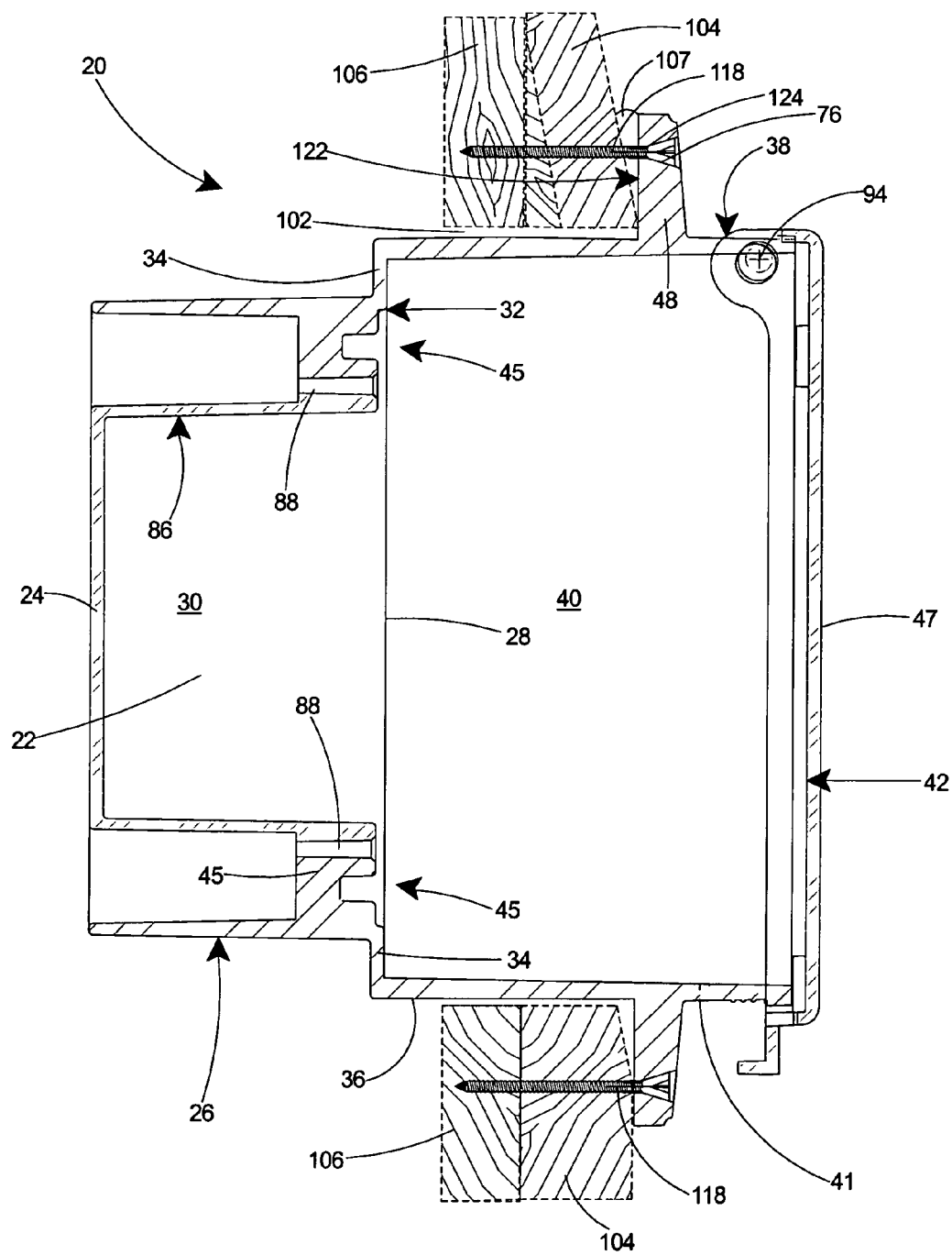
FIG. 2B is a sectional view of the recessed electrical box taken along line 2—2 of FIG. 1 and shown mounted to the siding of an existing building.

The reader is referred to FIG. 2A for an understanding of the installation procedure for the recessed electrical box on a building under construction and to FIG. 2B for an understanding of the installation procedure for the recessed electrical box on an existing building. If the building is under construction, with the substrate installed but no finished layer, the recessed electrical box is installed by first cutting an appropriately sized and shaped hole 102 in the substrate to accept the electrical box, as shown in FIG. 2A. The recessed electrical box 20 is then inserted into the hole 102 until the back surface 56 of the inner flange 46 is flush against the substrate 106. Fasteners 118 are then inserted through the slots 54 and tightened to secure the electrical box 20 to the substrate. Installing siding 104 on the substrate 106 then finishes the exterior of the building. The ends of the siding are placed flush with the second peripheral sidewalls 36 in the gap 97. Caulking 107 is then applied at the juncture of the electrical box 20 with the siding 104 to seal against rain and the elements.

With reference to FIG. 2B, if the building is an existing building, with both the siding and substrate installed, this is termed a "retrofit" of an electrical box to an existing building. In this situation, the recessed electrical box 20 is installed by first cutting an appropriately sized and shaped hole 102 in both the substrate 106 and the outer covering 104, which may be siding, stucco, or any other conventional outer covering material, to accept the electrical box 20. If the building is an existing building, the inner flange 46 is removed by cutting along the grooves 58 (see FIG. 4) that are adjacent the outer periphery 68 of the second box 38. With the inner flange 46 removed, the electrical box 20 is inserted into the hole 102 until the back surface 122 of the outer flange 48 is flush against the siding 104. Holes 120 are then drilled in the outer flange 48 and fasteners 118 inserted therethrough. Alternatively, the holes 120 can be preformed in the outer flange 48. The fasteners 118 are then tightened into the siding 104 and the substrate 106 to secure the recessed electrical box 20 to the siding and the substrate. Caulking 107 is then applied at the juncture of the electrical box 20 with the siding 104 to seal against rain and the elements.

Figure 6:
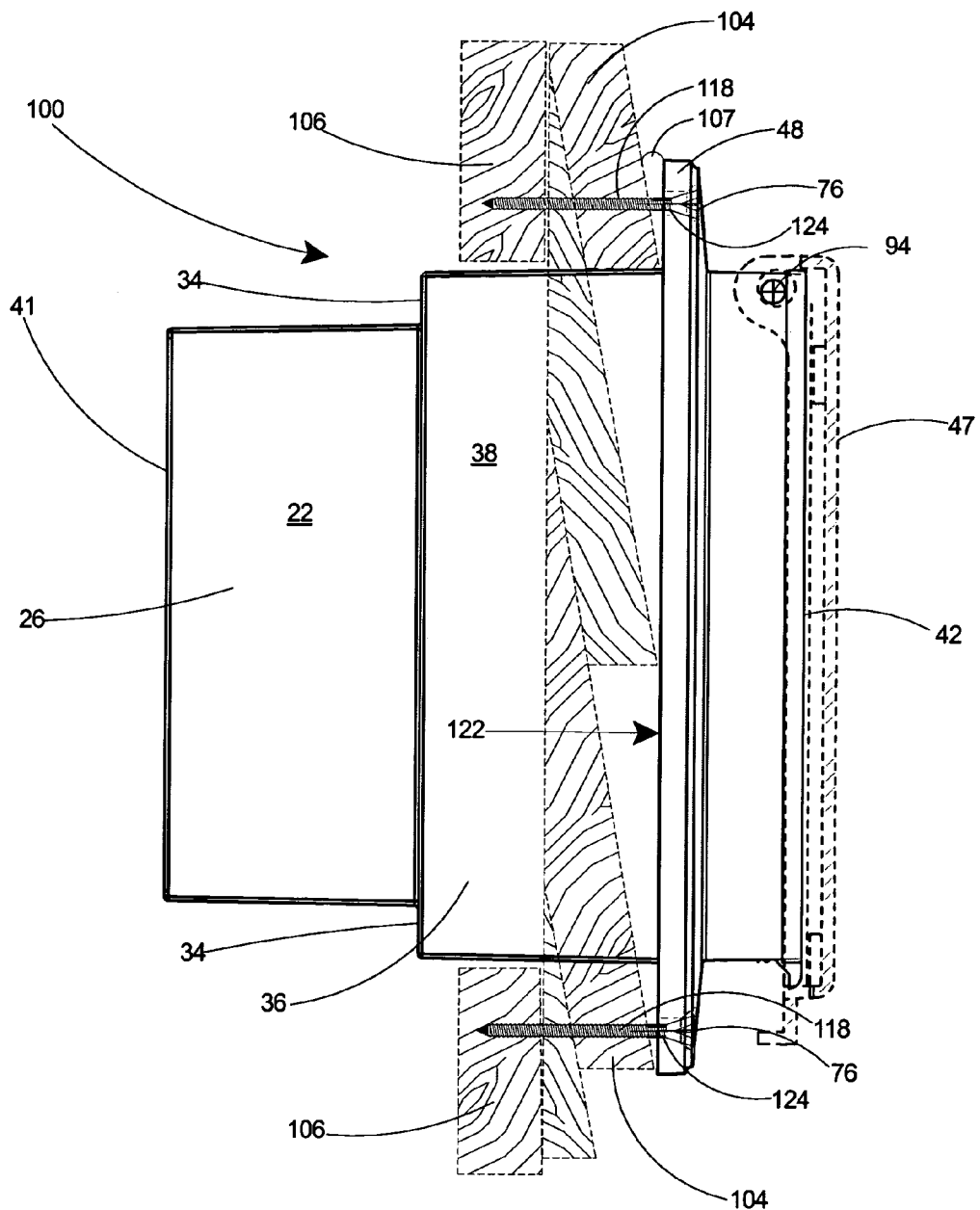
FIG. 6 is a side view of the recessed electrical box taken along line 6—6 of FIG. 5.
Figure 7:
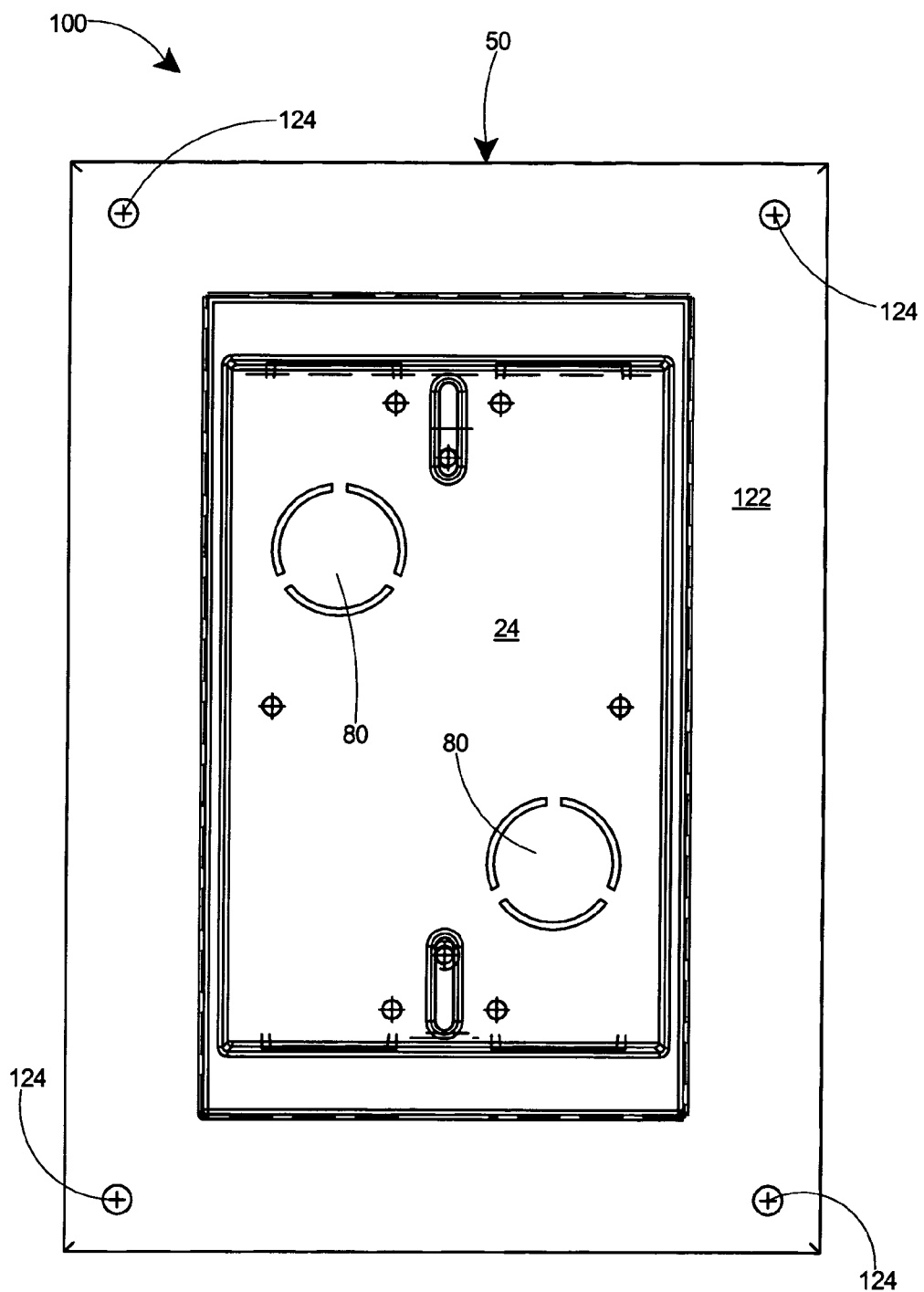
FIG. 7 is back view of the electrical box of FIG. 5.

The second embodiment of the recessed electrical box 100, shown in FIG. 6, simplifies installation of an electrical box on an existing building having any type of outer covering, including siding, stucco, or masonry. As shown in FIG. 6, both the substrate 106 and the siding 104 are installed. As the second embodiment 100 includes an outer flange 48 but no inner flange, the installer is saved the extra effort of having to remove an unneeded flange. To operate the second embodiment of the recessed electrical box 100, the installer cuts an appropriately sized and shaped hole 102 in the siding 104 and substrate 106. The recessed electrical box 100 is then inserted into the hole 102 until the back surface 122 of the outer flange 48 is flush against the siding 104. In the second embodiment of the recessed electrical box 100, holes 124 are included in the outer flange 48. The fasteners 118 are then are then inserted through the holes 124 and tightened into the siding 104 and the substrate 106 to secure the recessed electrical box 100 to the siding and the substrate. Caulking 107 is then applied in the same manner as for the preferred embodiment. Although FIG. 6 depicts a retrofit on a building having siding for an outer wall covering, the same procedure can be followed to install a retrofit on a building having an outer wall covering of stucco or masonry.

As described above, the third embodiment of the recessed electrical box 110 is for use on a building under construction that will be finished with a stucco layer 112. With reference to FIG. 9, electrical box 110 includes a removable inner flange 46 but no outer flange. To install the third embodiment 110 on a building under construction, the box 110 is simply pushed into an appropriately sized hole 102 that has been cut in the substrate 106. Fasteners 118 are then placed through the slots 54 in the ears 52 of the inner flange 46 and tightened into the substrate 106. There is no need for an outer flange, as a stucco layer will later be applied over the inner flange 46 and no unsightly gap will exist between the stucco and the electrical box. The inner flange 46, as shown in FIG. 10, includes a plurality of holes 114 that allow stucco to flow through the inner flange 46 and thereby form a better adhesion to the inner flange 46 and to the substrate 106.

Figure 15:
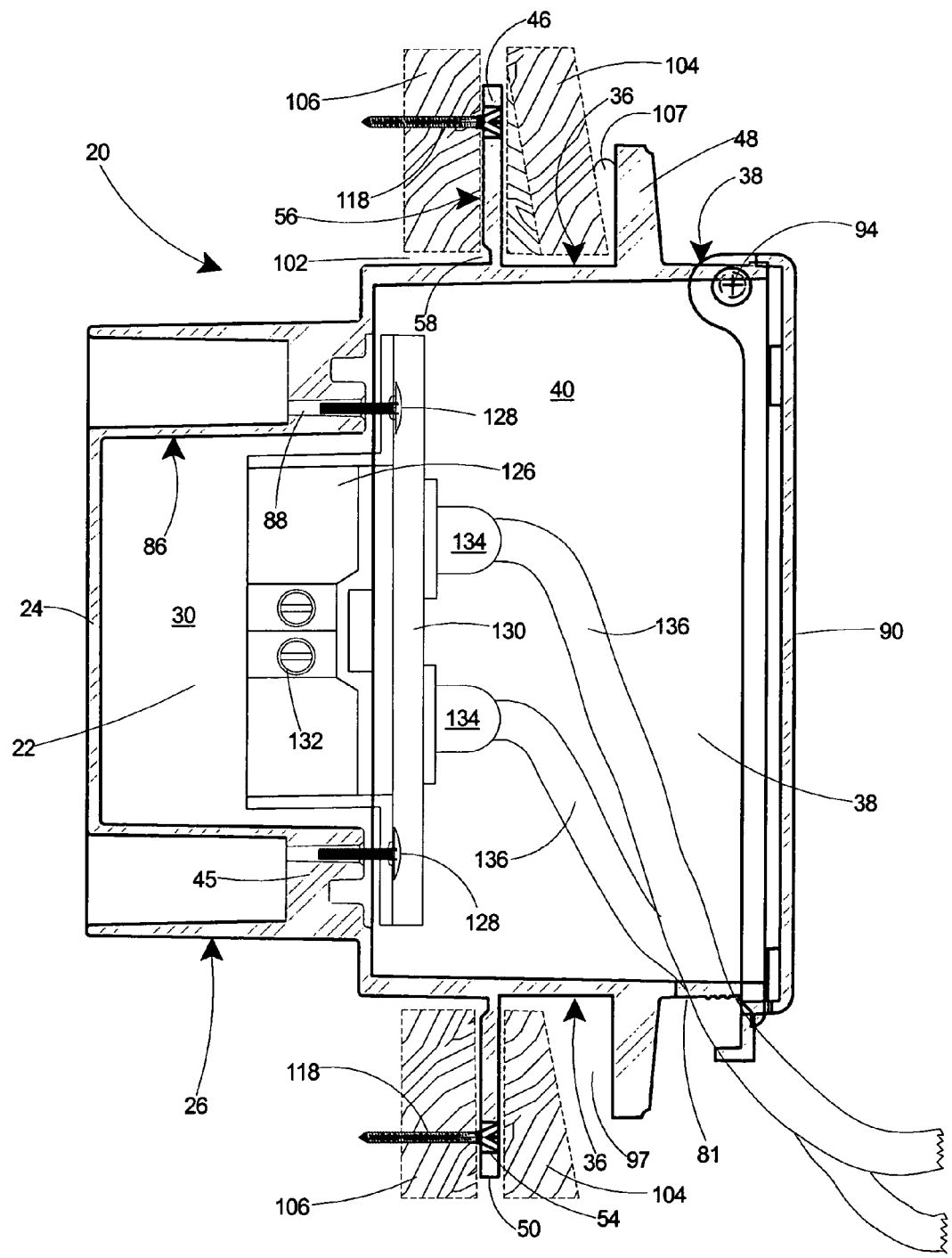
FIG. 15 is a sectional view of the recessed electrical box of FIG. 1 shown with a duplex receptacle installed therein and secured to an unfinished exterior wall.

FIG. 15 depicts installation of the preferred embodiment of the recessed electrical box 20 on a building under construction having an unfinished wall or substrate 106. For installation on the building under construction, a hole is made in the substrate 106 and the recessed box 20 is inserted until the inner flange 46 contacts the substrate 106. To secure the electrical box 20 to the building, fasteners 118 are driven through the slots 54 provided in the inner flange 46 and into the substrate 106. The finish layer 104, consisting of lapped siding or any appropriate siding material, is installed within the gap 97 and placed snug against the second peripheral sidewalls 36. A duplex outlet 126 or other electrical device is then secured therein by device fasteners 128. A face plate 130 is fastened to the electrical device or duplex outlet 126 to close the first box 22 and thereby seal the first enclosure 30 to protect the terminals 132 of the duplex outlet 126 and any wiring therein. The plug ends 134 of two electrical cords 136 are shown plugged into the duplex outlet 126 and run from the outlet 126 through the second enclosure 40 of the recessed electrical box 20 and through the circular cord openings 81 in the electrical box.

Figure 16:
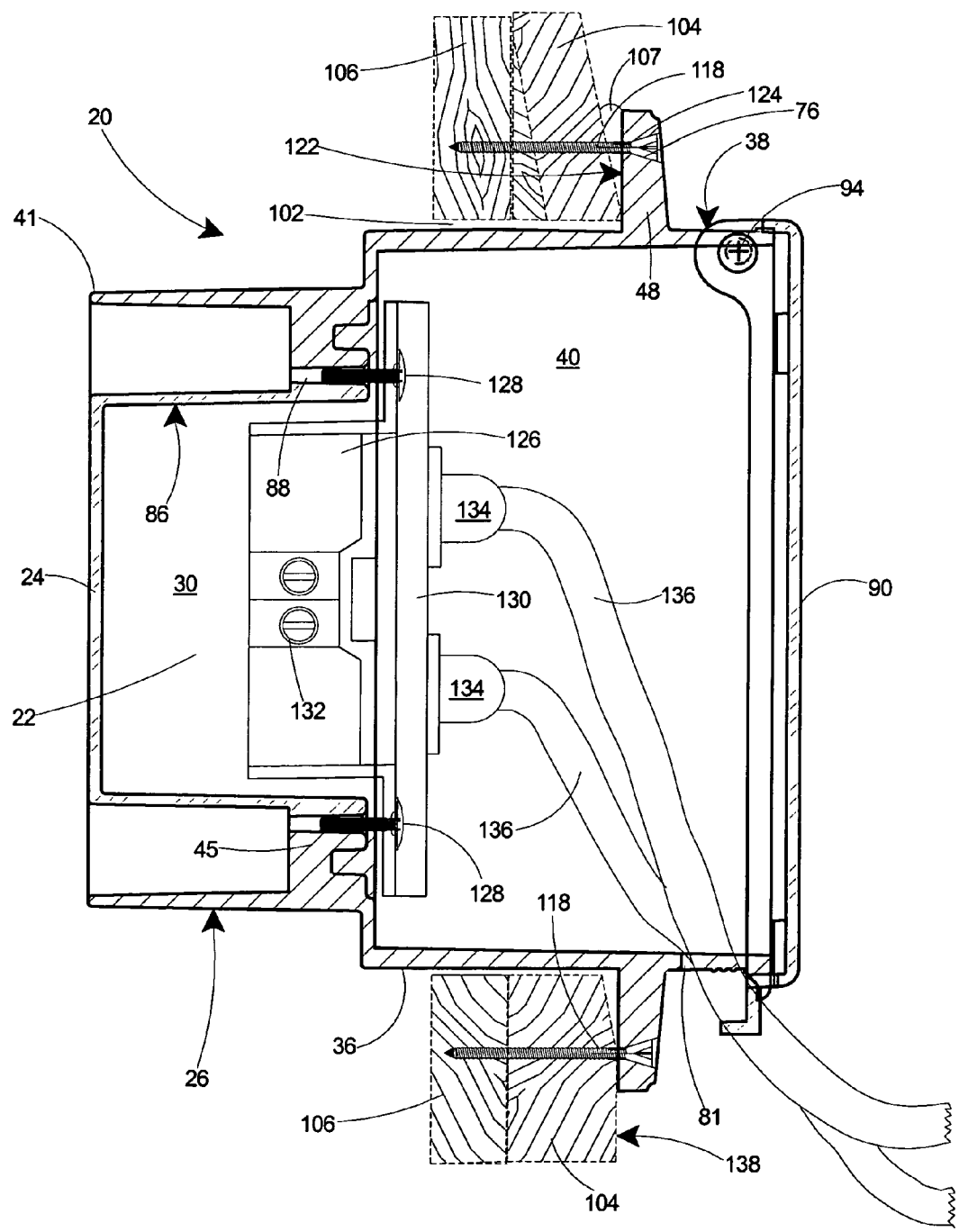
FIG. 16 is a sectional view of the recessed electrical box of FIG. 1 shown with a duplex receptacle installed therein and secured to a finished exterior wall.

FIG. 16 depicts installation of the preferred embodiment of the recessed electrical box 20 on a finished wall or siding 104. For installation on a finished wall 104, the inner flange is removed and a hole 102 cut in the siding 104 or other finish layer to a size large enough to accommodate the outer periphery of the second peripheral sidewalls 36. The outer periphery of the outer flange 48 can be provided with apertures 76 to accommodate fasteners 118. The electrical box 20, with the inner flange removed, is fitted into the hole 102 and pushed therein until the outer flange 48 is flush with the outer surface of the siding 104. Fasteners 118 are inserted therein through apertures 76 to secure the recessed electrical box 20 to the siding 104 and substrate 106 and thereby to the building. As illustrated in FIG. 16, the recessed outlet box 20 recesses the electrical device 126 well behind the outside surface 138 of the building and protects it from impacts. With the recessed electrical box 20 secured to the outside surface 138 and caulking 107 applied between the outer surface 138 and the box 20, the box member 41 and cover member 47 provide a rainproof electrical box. With the cover 47 closed, rain is prevented from entering the box member 41. When the cover member 47 is open, the box member 41 easily sheds any water that enters the box, as the second enclosure 40 is larger than the first enclosure 30, and the water will run out of the circular cord openings 81. The large second enclosure 40 and circular cord openings insure that water will run out and not build up to a level that will contact the electrical device 126 or the wiring therein.

Figure 17:
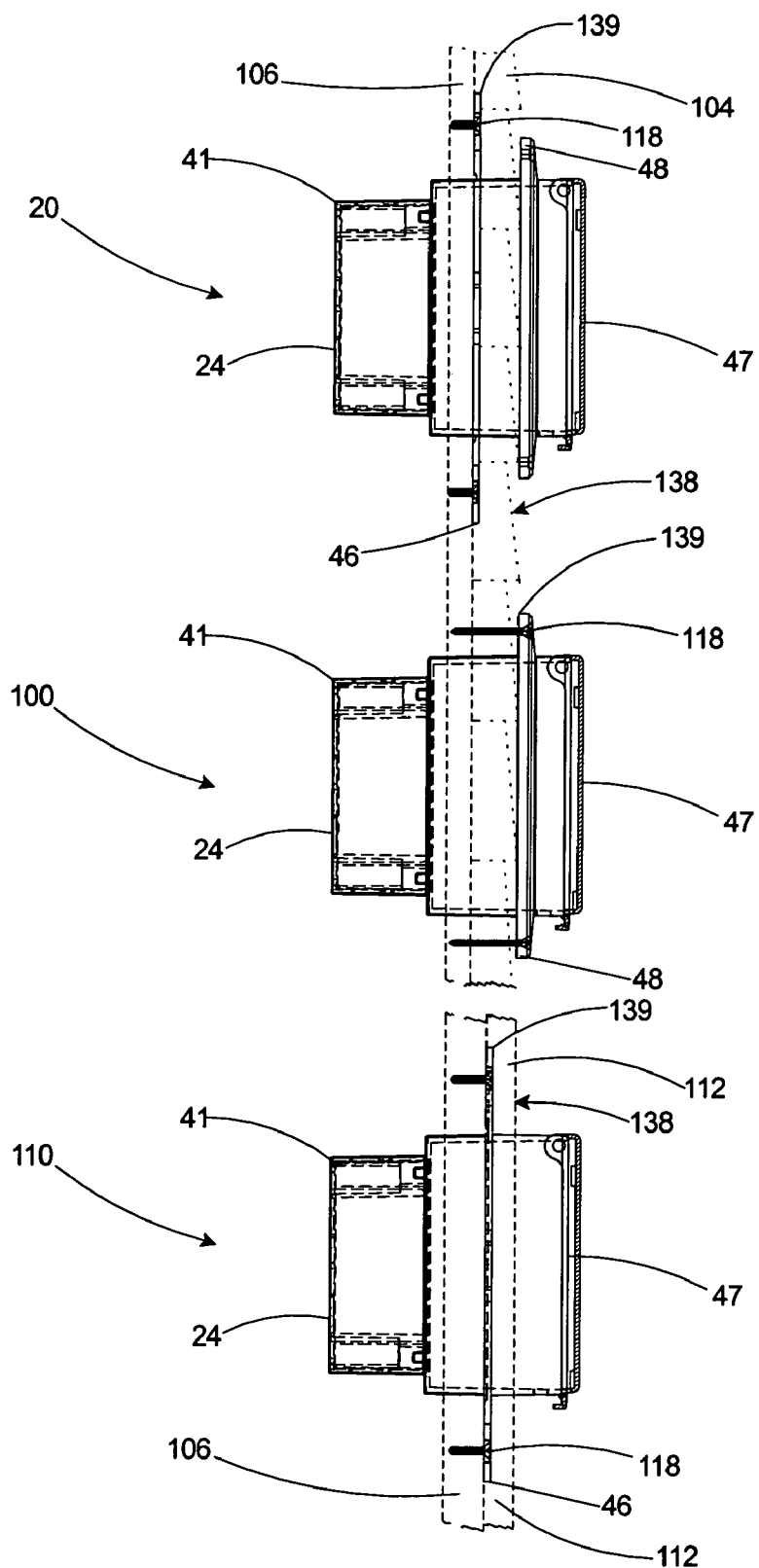
FIG. 17. is a conceptual view depicting the first and second embodiments of the recessed outlet box installed on a wall portion finished with siding and depicting the third embodiment of the recessed outlet box installed on a wall portion finished with stucco.

Referring to FIG. 17, the three embodiments of the recessed electrical box 20, 100, and 110 are shown installed on the outside surface 138 of a building. The flanges 46, 48 serve as a positioning arrangement 139 for positioning the electrical box 20, 100, 110 at the correct depth with respect to the wall. For the first embodiment of the recessed electrical box 20, shown at the top of the figure, either the inner 46 or outer 48 flange serves as the positioning arrangement, depending on the application. If the siding 104 has not been installed, the installer simply makes a hole in the substrate 106 and pushes the box 20 into the hole until the rear surface of the inner flange 46 contacts the outer surface 140 of the substrate 106. Fasteners 118 are then driven through the inner flange 46 to secure the recessed electrical box 20 to the substrate 106. Siding 104 is then inserted into the gap 97 surrounding all four sides of the electrical box 20 and the siding 104 is then fastened to the substrate 106.

Alternately, if it is a retrofit situation, the inner flange 46 of recessed outlet box 20 can be broken or cut away at the grooves 58 shown in FIG. 3. The outer flange 48 then serves as a positioning arrangement to achieve the proper depth of mounting of the electrical box 20. A hole is made in the substrate 106 and siding 104, and the electrical box 20 is pushed into the hole until the back surface of the outer flange 48 contacts the siding 104. Fasteners 118 are then driven through the outer flange 48 and into the substrate 106 to secure the electrical box 20 to the outside surface 138 of the building. The resultant secured and anchored electrical box 20 is shown in the middle of FIG. 17. Reference numeral 100 is also shown in FIG. 17 referring to the middle electrical box as the second embodiment of the electrical box described herein is identical to the first embodiment except that no inner flange is included thereon. Therefore, in a retrofit application, the second embodiment of the recessed electrical box 100 is installed in the same manner as the first embodiment except there is no need to break off an inner flange.

The third embodiment of the recessed electrical box 110, shown at the bottom of FIG. 17, includes only a breakaway inner flange 46. If the building is under construction and the substrate 106 exposed, the inner flange 46 serves as a positioning arrangement for mounting the electrical box 110 at the proper depth. Fasteners 118 can then be driven through the inner flange 46 of the recessed electrical box 110 to secure it to the substrate 106.

Regardless of which embodiment of the recessed electrical box 20, 100, 110 is used, the electrical device will be positioned substantially behind the outside surface 138 of the building, thereby providing a great deal of protection to the electrical device. As shown in FIG. 4, the planar front edge 42 of the recessed electrical box 20 further includes one or more U-shaped slots 142 in the side walls 36 of the second box 38. As shown in FIG. 13, the cover member 47 also includes one or more U-shaped slots 144 in the stiffening side wall 95. When the cover member 47 is pivotally connected to the box member 41 and the cover member 47 is closed upon the box member 41, as shown in FIG. 18, the second box 38 mates the U-shaped slots 142 of the second box 38 with the U-shaped slots 144 of the cover member 47 thereby providing a substantially circular cord opening 81 therein. The circular cord openings 81 thereby form a passageway for electrical cords. When the recessed outlet box of the present invention is mounted on a building with the cord openings 81 oriented downward vertically, the recessed outlet box creates a rainproof electrical box that effectively shields the electrical device from rainfall.

With reference to FIG. 1, the securement arrangement for securing an electrical device (not shown) to the recessed electrical box 20 includes a top boss 146 integral with the side wall 26 of the first box 22 and a bottom boss 148 integral with the side wall 26 of the first box 22. Bores 88 are included in each boss 146, 148 and may be smooth bores or threaded bores.

Figure 19:
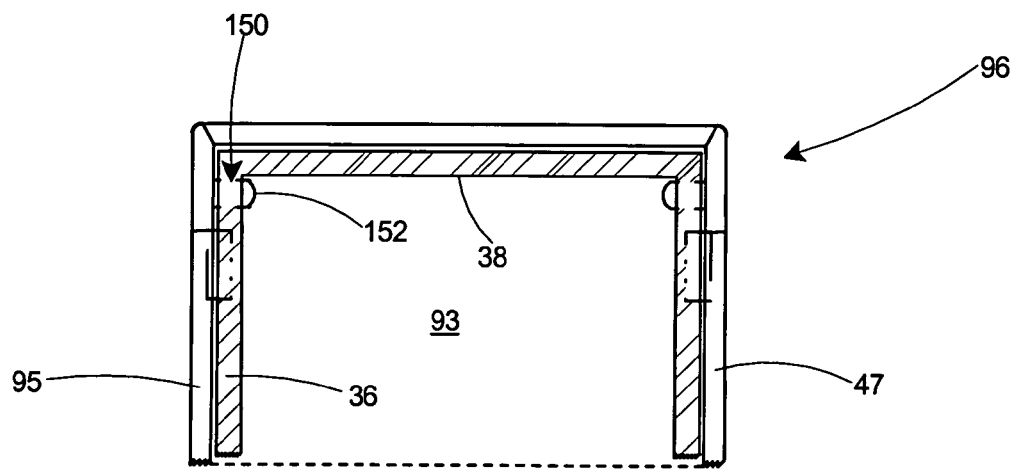
FIG. 19 is a sectional view of a top portion of the sidewalls of the second box and the cover member taken along line 19—19 of FIG. 9 and depicting an alternate cover arrangement for the recessed electrical box.

Referring to FIG. 19, an alternate cover arrangement 96 is shown for pivotally connecting the cover member 47 to the sidewalls 36 of the second box 38. The alternate cover arrangement 96 includes apertures 150 in the sidewalls 36 of the second box 38 and inward-extending posts 152 on the cover member 47. The inward-extending posts 152 extend through the apertures 150 in the sidewalls 36 of the second box 38 thereby pivotally connecting the cover member 47 to the second box 38.

Figure 20:
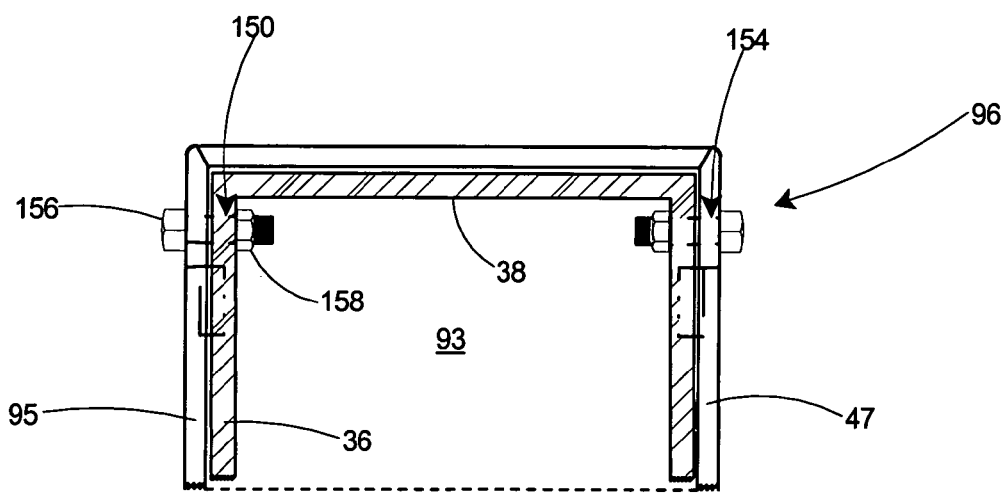
FIG. 20 is a sectional view similar to FIG. 19 but showing a second alternate cover arrangement for the recessed electrical box of the present invention.

With reference to FIG. 20, a second alternate cover arrangement 96 for pivotally connecting the cover member 47 to the sidewalls 36 of the second box 38 includes apertures 150 in the sidewalls 36 of the second box 38, apertures 154 in the cover member 47, and a bolt 156 disposed through the apertures 150, 154. A nut 158 secures the bolt 156 within the apertures 150, 154 thereby pivotally connecting the second box 38 to the cover member 47.

Having thus described the invention with reference to a preferred embodiment, it is to be understood that the invention is not so limited by the description herein but is defined as follows by the appended claims.

What is claimed is:

1. A recessed electrical box for installation on a surface and comprising:
    a first box having side walls, a back wall, a front opening, a front edge surrounding said front opening, and a cavity for receiving an electrical device therein;
    a transverse wall portion extending outwards from said front edge and forming a partial back wall of a second box;
    said second box including side walls and a front opening;
    said side walls of said second box of a depth that said front edge of said first box is positioned substantially behind said surface;
    a securement arrangement on said side walls of said first box for securing said electrical device thereto; and
    a cover arrangement for closing said front opening of said second box in a rain tight closure.

2. The recessed electrical box of claim 1 including at least one flange extending outwardly from said side walls of said second box.

3. The recessed electrical box of claim 2 wherein said flange extends orthogonally from said side walls of said second box.

4. The recessed electrical box of claim 1 wherein
    said second box includes two flanges extending outwardly from said side walls of said second box;
    said flanges are in parallel planes defining a gap therebetween; and
    the size of said gap is between 0.7 and 0.9 inch.

5. The recessed electrical box of claim 1 wherein said cover arrangement includes
    integral posts on said side walls of said second box; and
    a cover member pivotally connected to said posts.
6. The recessed electrical box of claim 5 including
    ears extending from said cover member;
    apertures in said ears; and
    said apertures of said ears received on said posts.
7. The recessed electrical box of claim 5 wherein said cover member includes
    a front wall; and
    a stiffening side wall orthogonal to said front wall.
8. The recessed electrical box of claim 7 wherein said stiffening side wall extends no more than 0.30 inch from said front wall.
9. The recessed electrical box of claim 7 wherein said front wall of said cover member is no greater than 3.5 inches width by 6.0 inches length.
10. The recessed electrical box of claim 7 wherein
    said second box includes one or more U-shaped slots in said side walls connecting with said front opening;
    said cover member includes one or more U-shaped slots in said stiffening side wall; and
    closure of said cover member on said opening of said second box mates said U-shaped slots of said second box with said U-shaped slots of said cover member thereby providing a substantially circular cord opening therein.
11. The recessed electrical box of claim 10 wherein positioning of said recessed electrical box on the wall of a building with said circular cord opening oriented downward vertically creates a rainproof electrical box.
12. The recessed electrical box of claim 5 wherein
    said first box and said second box are integrally molded of plastic in one-piece;
    said cover member is molded of plastic in one-piece; and
    said recessed electrical box comprises two pieces with said cover member connected to said box member.
13. The recessed electrical box of claim 1 wherein said cover arrangement includes
    apertures in said side walls of said second box;
    inward-extending posts on said cover member; and
    said cover member pivotally connected to said electrical box by said posts on said cover member extending through said apertures in said side walls.
14. The recessed electrical box of claim 1 wherein said cover arrangement includes apertures in said side walls of said second box;
    apertures on said cover member; and
    a bolt disposed through said apertures in said side walls and said apertures in said cover member thereby pivotally connecting said electrical box to said cover member.
15. The recessed electrical box of claim 1 wherein said first box and said second box are constructed of metal.
16. The recessed electrical box of claim 1 wherein said electrical device mounted within said recessed electrical box places said electrical device substantially behind said surface.
17. The recessed electrical box of claim 1 wherein said recessed electrical box is gasketless.
18. The recessed electrical box of claim 1 wherein said securement arrangement includes
    a top boss integral with said side wall of said first box;
    a bottom boss integral with said side wall of said first box; and
    bores in each of said bosses.

* * * * *